O. V. MAURER.
INCANDESCENT LAMP AND METHOD OF MAKING THE SAME.
APPLICATION FILED MAR. 10, 1919.
1,398,032.
Patented Nov. 22, 1921.
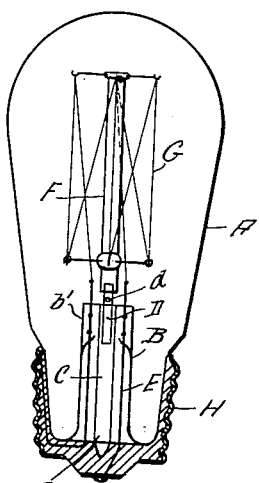
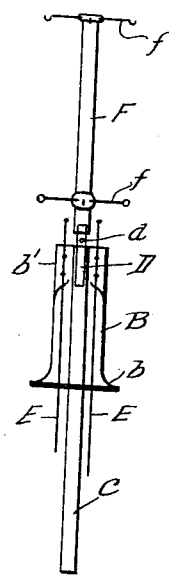
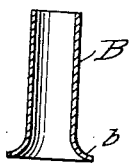
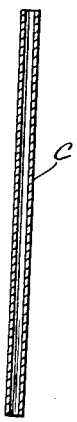
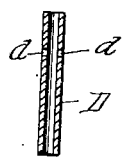
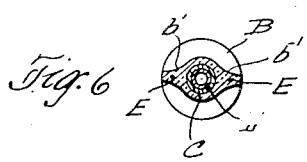
Inventor
Oscar V. Maurer,
By Baker Macklin,
Attys.

UNITED STATES PATENT OFFICE.

OSCAR V. MAURER, OF EAST CLEVELAND, OHIO.

INCANDESCENT LAMP AND METHOD OF MAKING THE SAME.

1,398,032.

Specification of Letters Patent.   Patented Nov. 22, 1921.

Application filed March 10, 1919. Serial No. 281,671.

*To all whom it may concern:*

Be it known that I, OSCAR V. MAURER, a citizen of the United States, residing at East Cleveland, in the county of Cuyahoga and State of Ohio, have invented a certain new and useful Improvement in Incandescent Lamps and Methods of Making the Same, of which the following is a full, clear, and exact description, reference being had to the accompanying drawings.

This invention relates to a tipless incandescent lamp and its method of manufacture. Tipless lamps are very desirable on account of the saving in breakage, neater appearance of the lamps and the avoidance of the occasional accidents which occur from striking against the usual tips. Difficulty heretofore with tipless lamps has been in the expense of manufacture. Modern lamps ordinarily use a tubular glass mount which carries the filaments and is joined at its base to the lower edge of the globe. The upper end of this mount is pinched onto the leading wires preferably by automatic machines. It has been proposed to tubulate these lamps through the interior of the mount but the clamping of the upper portion of the mount on the leading wires is very liable to close the upper end of the tubulating stem interfering with exhaustion. To avoid this, it has been proposed to plug the tubulating stem with removable material to prevent its collapsing, but this is troublesome, involves labor and expense in removing the plug and consequent danger of breaking the mount or filament.

I have discovered a way by which the tubulating stem may be kept open while the upper end of the mount is pinched onto the leading wires, this stem being accordingly available for exhausting the globe. After exhaustion the stem is sealed off adjacent to the base of the mount and the base of the lamp is put on in the usual manner. My method of accomplishing the result is to place within the tubulating stem a short stiff bushing which lies within the upper end of the stem and prevents its collapsing. This bushing may or may not make an air tight connection with the tubulating stem. It does, however, preserve the stem from collapsing internally and allows the upper end of the mount to be pinched together automatically upon the tubulating stem. The tubulating stem is thus retained open while it is sealed in an air tight manner to the mount, and the bushing remains permanently in place and the exhaustion takes place through the bore of the bushing.

My bushing may, if desired, project above the mount and carry a central standard for the filament. When such standard is carried, it seals the end of the bushing and to furnish the desired air exit I provide one or more lateral openings through the bushing into its bore. My invention is also applicable to that type of lamp, like those for automobile headlights, which has a solid glass mount plugging the end of the globe. I use the term "mount" generically to indicate that portion of the lamp which carries the leading wires, irrespective of its form.

The various characteristics mentioned in the last two paragraphs are included within my invention. The invention comprises both the process of making the lamp as above outlined, and as hereinafter more fully explained, and the lamp itself having the characteristics stated.

In the drawings, Figure 1 is a sectional side elevation of one form of lamp made by my process; Fig. 2 is a side elevation of a mount, standard and tubulating tube and bushing, all in place after the mount has been pinched onto the tube and leading wires; Figs. 3, 4 and 5 are vertical sections of the mount, tubulating tube and bushing respectively, the latter being shown on a larger scale; Fig. 6 is a cross section through the upper end of the mount shown in Figs. 1 and 2 after the parts are assembled.

As shown in Fig. 1, A indicates the globe proper which may be of any suitable form or shape; B is the mount which as shown is formed with a flaring lower end *b* by which it is joined to the globe proper. C designates the glass tubulating tube and D the bushing. This bushing is preferably of metal and is of such size as to fit snugly within the tubulating tube and retains its position therein. This bushing is shown as having a bore extending completely through it and having lateral openings *d* leading from this bore to the outside. E designates the leading wires, F the central glass standard with arms *f*, and G the filament strung on these arms and connected with the leading wires in the usual manner.

In the manufacture of my lamp, the bushing D is positioned in the end of the tubulating tube C. This tube and the leading wires are placed in the mount B and the upper end of this mount is pinched together. This is done while the upper end of the mount is hot and results in this portion taking approximately the form shown at $b^1$ in Fig. 6 and engaging in an air-tight manner the leading wires and the tubulating tube C. This tube softens and not only fuses with the mount but makes a fairly tight connection with the bushing D.

The form of the mount and the filament will vary greatly with different types of lamps. When a filament of the form shown at G in Fig. 1 is employed, I may secure a glass standard F, having arms $f$, directly on the end of the bushing D, or if desired the upper end of the bushing may be turned laterally out of the way of the standard, and the standard secured directly to the mount. In any case access for air is allowed to the bushing above the mount. If the standard is to be carried by the bushing this may be readily accomplished by softening the lower end of the glass standard and forcing the bushing into it. This operation may be performed after the tubulating tube and bushing are assembled in the mount, or if desired the bushing may be first connected to the standard, or the whole operation may be done at one time in a suitable machine.

After the supporting structure as shown in Fig. 1 is completed, the filament is applied and the lower end of the mount is fused to the lower edge of the globe. The lamp is then ready for exhaustion. In the exhausting operation, the air pump is attached to the tube C and the lamp exhausted in the usual manner, after which the tube C is sealed off adjacent to the lower end of the mount, as indicated at $c$ in Fig. 1. Then any suitable base H is applied and its contact portions connected with the leading wires in the usual manner. When the lamp is finished, the sealing tip $c$ is entirely inclosed and protected by the cementitious material carried within the base.

Having thus described my invention what I claim is:—

1. A filament mount, comprising a tubulating tube, and means permanently carried within the tube for preventing its collapsing while allowing the passage of air through it.

2. In combination, a tubulating tube, a mount fused thereto, and a bushing having a passage communicating with the passage in said tube, said bushing being permanently carried within the tube.

3. In combination with a globe for an incandescent lamp, a member connected therewith, leading wires extending through said member, a tubulating tube sealed within said member and a bushing within the tube at the region where it is so sealed, whereby communication with the interior of the globe is maintained.

4. The combination of a globe, a mount carried thereby, a tubulating tube within the mount, the mount being fused to the tube, a permanent bushing within the tube, and a filament standard carried by the mount.

5. The combination of a globe, a mount carried thereby, a tube within the mount and fused to it, a short bushing within the upper end of the tube and projecting above it, lead wires extending through the mount, and a filament connected to said wires.

6. The combination of a tubular mount for an incandescent lamp, pinched together at its upper end, leading wires within the mount extending through such pinched part, an exhausting tube within the mount and fused to it at the pinched part, and a short bushing within the exhausting tube at such pinched part, terminating above the lower end of the tube.

7. The combination of a globe, a mount carried thereby, a tubulating tube within the mount, the mount being fused to the tube, a bushing within the tube, and a filament standard carried by the bushing.

8. The combination of a globe, a mount carried thereby, a tubulating tube within the mount and fused to it, a bushing within the tube and projecting above it and adapted to convey air from the globe to the tube, and a filament standard carried by the bushing.

9. The combination of a globe, a tubular mount carried thereby, a tubulating tube within the mount, the upper end of the mount being fused to the tube, a bushing within the tube and projecting above it and a filament standard carried by the bushing, there being a lateral opening from the bore of the bushing to the outside between the upper end of the mount and the lower end of the filament standard.

10. The method of making an incandescent lamp, comprising inserting a bushing within a tubulating stem for preventing the collapsing of the stem, fusing said stem to a portion of the globe structure and exhausting the globe through such tubulating stem and sealing the stem shut below the bushing.

11. The method of making an incandescent lamp, comprising inserting a short bushing permanently within the upper part of a tubulating stem, pinching a mount onto said stem around said bushing, and, after the mount is secured to the globe, exhausting the globe through such tubulating stem.

12. The method of making incandescent lamps, comprising inserting a short bushing within the upper end of a tubulating tube, taking a mount and placing within it lead wires and said tubulating tube, forcing the hot mount into a tight engagement with the lead wires and tube, completing the formation of the lamp, and exhausting it through the tubulating tube.

13. The method of making incandescent lamps, comprising inserting within the upper end of a tubulating tube a metal bushing to prevent the tube from collapsing, taking a tubular mount, placing within it lead wires and the tube, pinching the upper end of the mount into a tight engagement with the lead wires and tube, completing the formation of the lamp, exhausting it through the tube, sealing the same shut adjacent to the base of the mount, and applying the lamp base across the sealed end of the tubulating tube.

14. The method of making incandescent lamps, comprising inserting the lower end of a bushing into the upper end of an exhausting tube, placing within a tubular mount the lead wires and the exhausting tube, securing these parts together by pinching the upper end of the mount, securing a filament standard to the upper end of the bushing, and exhausting the completed globe through said tube.

15. The method of making incandescent lamps, comprising inserting a metal bushing into the end of a glass tube, placing said tube and the leading wires within a tubular mount, heating and squeezing the upper end of the mount onto the tube to make a fused connection therewith, while the tube is maintained from collapsing by its internal bushing, securing a standard to the bushing, mounting the filament on the standard and connecting it with the leading wires, securing the mount to the globe, and exhausting the globe through the tube.

16. In combination, a globe, a filament mount, a tubulating stem therein, and a bushing adapted to be sealed within the stem, said bushing having an opening communicating with the atmosphere within the globe.

17. An incandescent lamp comprising a globe, a mount carried thereby, a tubulating stem, a rigid, relatively non-fusible bushing in the upper end of the stem, said bushing having a lateral opening in communication with the atmosphere within the globe, the upper end of the bushing being adapted to support a filament standard.

In testimony whereof, I hereunto affix my signature.

OSCAR V. MAURER.